116,924

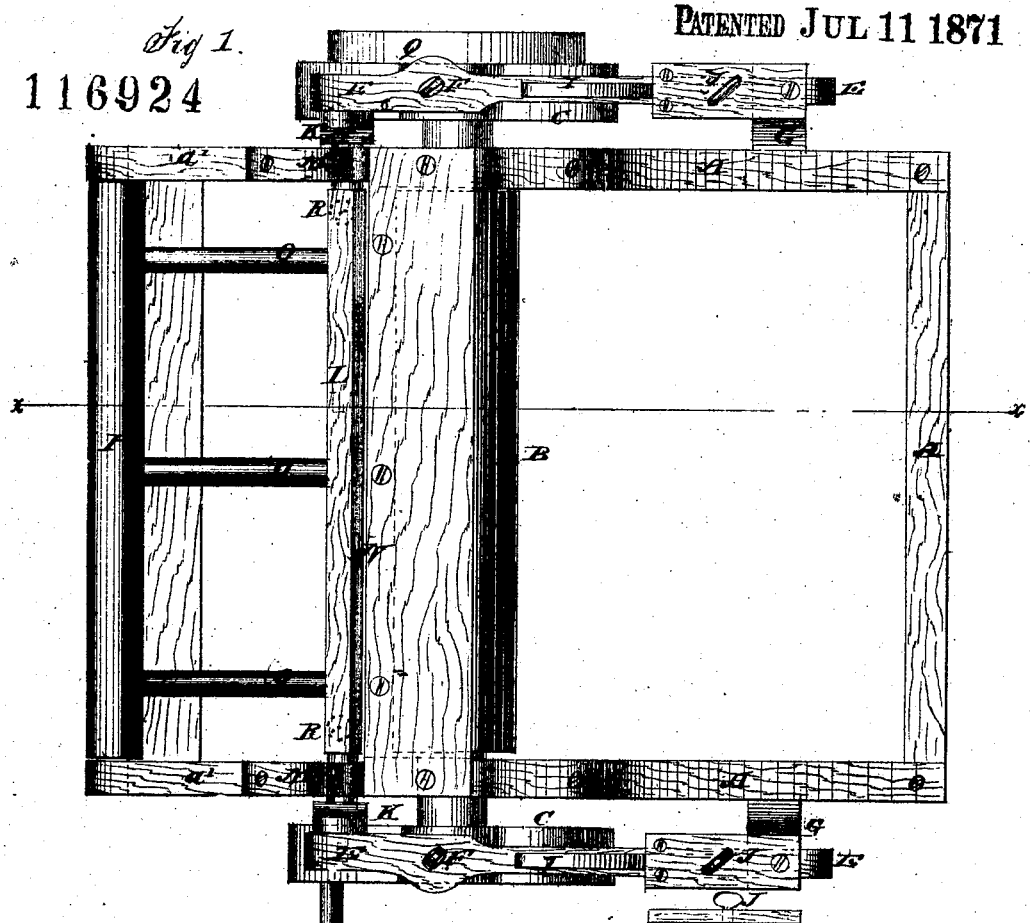
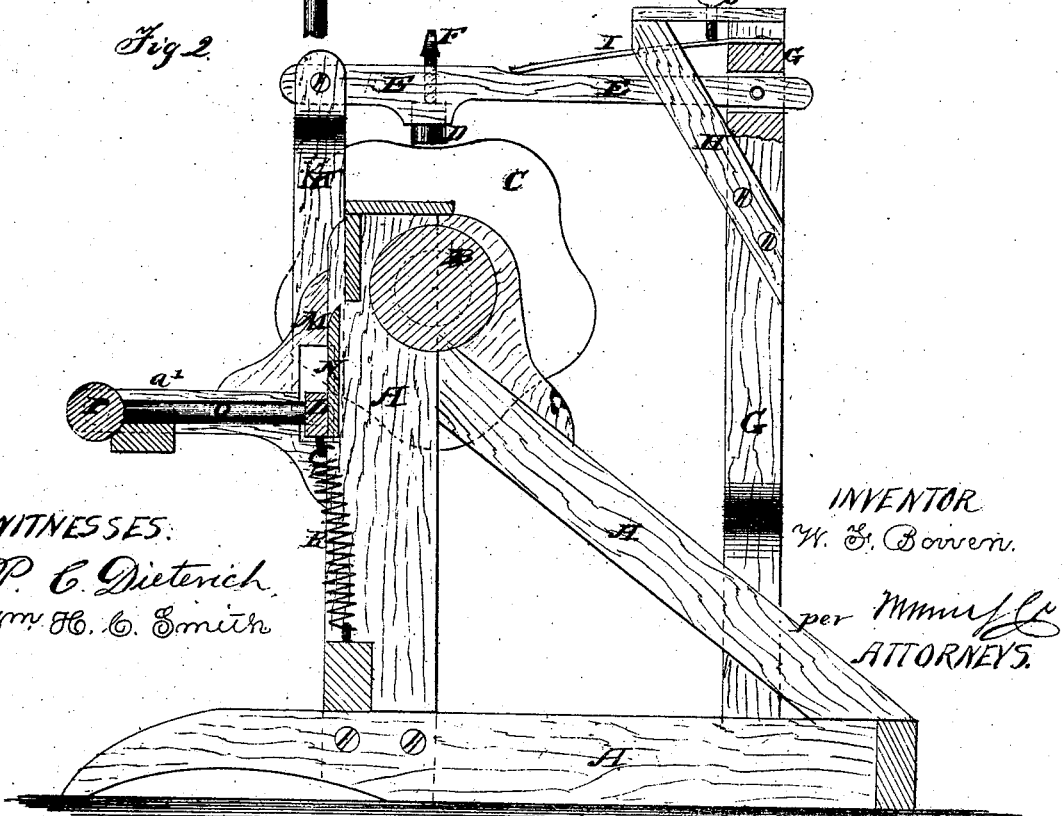

UNITED STATES PATENT OFFICE.

WILLIAM F. BOWEN, OF STARK, FLORIDA.

IMPROVEMENT IN COTTON-GINS.

Specification forming part of Letters Patent No. 116,924, dated July 11, 1871.

*To all whom it may concern:*

Be it known that I, WILLIAM F. BOWEN, of Stark, in the county of Bradford and State of Florida, have invented a new and useful Improvement in Cotton-Gin; and I do hereby declare that the following is a full, clear, and exact description thereof, which will enable others skilled in the art to make and use the same, reference being had to the accompanying drawing forming part of this specification, in which—

Figure 1 is a top view of my improvement as attached to the frame-work of a cotton-gin. Fig. 2 is a detail vertical section of the same taken through the line $x\ x$, Fig. 1.

Similar letters of reference indicate corresponding parts.

My invention has for its object to improve the construction of the cotton-gin known as the "McCarthy Long-Staple or Sea-Island Cotton-Gin" so as to make it simple in construction and more easily operated, obviating the objections made to the McCarthy gin; and it consists in the construction and combination of the various parts, as hereinafter more fully described.

A is the frame-work of the machine, in bearings, in the upper part of which the journals of the roller B revolve. To the projecting ends of the journals of the roller B are attached wheels C, having five (more or less) cams formed upon their faces. Upon the faces of the wheels C bear the hard-wood pins or blocks D, which are attached to the levers E so that the said levers E may be operated by the revolution of the cam-wheels C. The pins or blocks D may have friction-wheels or rollers pivoted to them or used in their stead, if desired. The blocks or rollers D are connected with the levers E by thumb-screws F, to enable the said levers to be adjusted as required for regulating the clipper. The rear ends of the levers E are pivoted to supports G attached to the frame A and pass between guards H attached to said supports G. The levers E are held down upon the faces of the cam-wheels C by the springs I, the rear ends of which are secured to the supports G, and the forward ends of which rest upon the upper side of the lever E. The springs I are designed to keep the blocks or wheels D, attached to the levers E, at all times held down close to the faces of the cam-wheels C to make the clipper work promptly. The tension of the springs I is regulated by a set-screw, J, passing in through the cap-plate attached to the upper ends of the supports G and guards H, and the forward ends of which bear against the upper sides of the springs I. To the forward ends of the levers E are pivoted the upper ends of the connecting-rods or bars K, the lower ends of which are pivoted to the ends of the bar L or clipper N, which pass through guide-slots in the base parts of the arms $a'$ of the frame A and in the brace or angle-blocks M attached to said arms and frame. N is the clipper, which is attached to the bar L. The bar L is attached to the ends of the bars O, the other ends of which are attached to the roller or rock-shaft P, the journals of which work in bearings in the outer ends of the arms $a'$. The bar L greatly strengthens the clipper and makes it more effective and durable. To one of the journals of the roller B, or to one of the cam-wheels C, is attached a pulley, Q, to receive the belt by which the gin is driven. The other parts of the gin are constructed in the ordinary manner, and are not shown in the drawing. R are spiral springs attached to the bar L or clipper N near the ends. The lower ends of the spiral springs R are attached to the cross-bar or some other suitable part of the frame A. The springs R are designed to draw the clipper N down quickly after being raised by and released from the cams of the wheels C, and, at the same time, to hold the blocks or rollers D down upon the cam-wheels C. The spiral springs R may be used in place of or in connection with the springs I, as may be desired.

Having thus described my invention, I claim as new and desire to secure by Letters Patent—

The combination of the cam-wheels C, blocks or rollers D, levers E, thumb-screws F, springs I and R, either or both, set-screws J, and connecting-rods K, with the roller B, clipper N, and frame A, substantially as herein shown and described, and for the purpose set forth.

WILLIAM F. BOWEN.

Witnesses:
WILLIAM UNDERHILL,
J. C. WEIR.